(12) United States Patent
Cloutier et al.

(10) Patent No.: US 7,973,671 B2
(45) Date of Patent: Jul. 5, 2011

(54) SHEAR COMPONENT BREAKAGE DETECTION

(75) Inventors: Marius Cloutier, Longueuil (CA); Jean Pronovost, Saint-Mathieu-de-Beloeil (CA)

(73) Assignee: Vibrosystm Inc., Longueuil (Québec)

( * ) Notice: Subject to any disclaimer, the term of this patent is extended or adjusted under 35 U.S.C. 154(b) by 1265 days.

(21) Appl. No.: 11/569,282

(22) PCT Filed: May 19, 2005

(86) PCT No.: PCT/CA2005/000769
§ 371 (c)(1),
(2), (4) Date: Nov. 17, 2006

(87) PCT Pub. No.: WO2005/111438
PCT Pub. Date: Nov. 24, 2005

(65) Prior Publication Data
US 2008/0092801 A1 Apr. 24, 2008

Related U.S. Application Data

(60) Provisional application No. 60/572,128, filed on May 19, 2004.

(51) Int. Cl.
*G08B 21/00* (2006.01)
(52) U.S. Cl. ..... 340/679; 340/680; 340/687; 340/686.4; 340/691.7; 340/539.1; 116/200; 116/208; 411/1; 411/2; 411/8
(58) Field of Classification Search .................. 340/680, 340/687, 679, 686.4, 691.7, 539.1; 116/200, 116/208; 411/1–2, 8
See application file for complete search history.

(56) References Cited

U.S. PATENT DOCUMENTS

| | | | | |
|---|---|---|---|---|
| 1,920,659 A | * | 8/1933 | Naylon | 116/208 |
| 2,107,604 A | * | 2/1938 | Friday | 411/379 |
| 2,113,666 A | * | 4/1938 | Suman | 318/475 |
| 2,124,965 A | * | 7/1938 | Lind | 192/150 |
| 2,435,343 A | * | 2/1948 | Downey | 123/198 DA |
| 2,503,141 A | * | 4/1950 | Stone | 340/668 |
| 2,747,454 A | * | 5/1956 | Bowersett | 411/8 |
| 2,827,122 A | * | 3/1958 | Clark | 169/75 |
| 2,850,937 A | * | 9/1958 | Ralston | 411/11 |
| 3,047,847 A | * | 7/1962 | Marsh et al. | 340/540 |
| 3,407,906 A | * | 10/1968 | Lorenz | 188/1.11 R |

(Continued)

FOREIGN PATENT DOCUMENTS

GB 2212284 7/1989

*Primary Examiner* — Daniel Wu
*Assistant Examiner* — Son M Tang
(74) *Attorney, Agent, or Firm* — Ogilvy Renault LLP (57) ABSTRACT

A wireless breakage indicator for a shear pin having an axial bore. The indicator (10) comprises a stem (20) having a head (22) and a foot (24) at opposite ends thereof; a sleeve (32) around a portion of the stem between a first (28) and second (30) axial positions, the stem (20) and sleeve (32) adapted to be broken by the shear pin (12) in the event of its breakage; a spring (26) compressed between the head (22) of the stem (20) and a first end (34) of the sleeve (32); the foot (24) of the stem (20) being retained to the second end (36) of the sleeve (32). The breakage of the stem (20) frees the head (22) to be displaced by the spring (26) and indicate breakage of the shear pin (12). The indication can be direct, by visual inspection of the displaced head, or indirect by the displacement of the head activating a transmitter.

22 Claims, 5 Drawing Sheets

U.S. PATENT DOCUMENTS

| | | | | |
|---|---|---|---|---|
| 3,621,810 A * | 11/1971 | Zuck, Jr. | | 116/283 |
| 3,716,113 A * | 2/1973 | Kobayashi et al. | | 188/1.11 R |
| 3,846,795 A * | 11/1974 | Jones | | 340/540 |
| 3,960,456 A | 6/1976 | Norris | | |
| 4,041,776 A * | 8/1977 | Payne | | 73/800 |
| 4,250,480 A * | 2/1981 | Newsom | | 337/6 |
| 4,271,120 A * | 6/1981 | Michaud | | 422/53 |
| 4,415,888 A * | 11/1983 | van der Lely | | 340/684 |
| 4,658,645 A * | 4/1987 | Petersen, Jr. | | 73/170.16 |
| 4,928,531 A | 5/1990 | Schult et al. | | |
| 4,934,884 A * | 6/1990 | Rooke | | 411/8 |
| 4,981,404 A * | 1/1991 | Chamberlain et al. | | 411/14 |
| 5,017,912 A * | 5/1991 | Willis | | 340/679 |
| 5,042,888 A | 8/1991 | Shinjo | | |
| 5,226,765 A * | 7/1993 | Walton | | 411/14 |
| 5,255,760 A * | 10/1993 | Lamb et al. | | 188/1.11 L |
| 5,291,789 A * | 3/1994 | Walton | | 73/761 |
| 5,584,627 A * | 12/1996 | Ceney et al. | | 411/14 |
| 5,604,481 A * | 2/1997 | Lin | | 340/442 |
| 6,556,143 B2 * | 4/2003 | Noah | | 340/679 |
| 7,392,123 B2 * | 6/2008 | Heinsey et al. | | 701/50 |
| RE40,884 E * | 9/2009 | Masterson | | 43/121 |
| 2004/0252029 A1 | 12/2004 | Banville et al. | | |

* cited by examiner

SHEAR COMPONENT BREAKAGE DETECTION

CROSS-REFERENCE TO RELATED APPLICATIONS

The present application is a national phase entry of PCT patent application no. PCT/CA2006/000769 filed on May 19, 2005 which claims priority of U.S. provisional patent application No. 60/572,128 filed on May 19, 2004, the specifications of which is are hereby incorporated by reference.

TECHNICAL FIELD

The invention relates to the detection of a sheared component on a machinery structure, and more particularly to the indication of shear component breakage.

BACKGROUND OF THE INVENTION

Shear pins are well known in the art and are often used in applications where excessive and unusual constraints applied to a component of machinery can be dangerous for health and safety reasons, or may cause expensive machinery components to be permanently damaged. In these circumstances, a shear pin is used to provide a predetermined level of resistance to shear stress, and when that level is exceeded by an abnormal condition, the shear pin breaks at a predetermined location, warning a technician in some way and thus protecting an operator or a more expensive component.

In the field of hydroelectric power plants, for example, turbines are equipped with wicket gates that control the quantity of water allowed inside. The transmission of movement from a driving component to the wicket gate is done via a shear pin. In the advent of a foreign object jamming inside the gate, the excessive force transmitted to the shear pin will result in the breakage of a shear pin. The wicket gate will no longer be driven and will not be damaged.

Given their very nature, shear pins are expected to break in certain conditions and must thereafter be replaced. In certain applications, shear pins are disposed in hard-to-reach areas, and although the top of the shear pin are sometimes visible, it is remains difficult to tell if they are broken or not. Disassembling machinery components to verify if a shear pin is broken or not can be quite time consuming. Further, when many shear pins are provided on a piece of machinery, it is not always obvious which particular shear pin has broken and much time is lost inspecting the piece of machinery to find the broken one. Thus, there remains a need for an indication of shear pin breakage either visually accessible at the visual portion of shear pins, or accessible at a remote location from them.

Some detection devices have been provided in the past, but most are electrical and resistor based. Wires exiting shear pins and connecting them to a receiver circuitry are cumbersome, especially when many shear pins are used.

SUMMARY OF THE INVENTION

An object of the invention is to provide a shear pin breakage indication device which overcomes at least some of the shortcomings of the prior art.

Another object of the invention is to provide a shear pin breakage indicator which is mechanical.

Yet another object of the invention is to provide a visual indicator of shear pin breakage.

Another object of the invention is the ability to easily add to the mechanical shear pin breakage indicator an embedded electronic device to improve the efficiency of detecting a broken shear pin.

Still another object of the invention is to provide an indicator of shear pin breakage at a remote location by wireless transmission.

In accordance with one aspect, the invention provides a breakage indicator for a shear component, the indicator comprising: a head connected to a foot via a stem, the stem being adapted to be broken into a head portion and a foot portion at an axial location as a result of breakage of the shear component; an urging member adapted to displace the head towards an indication position upon breakage of the stem; and the foot being adapted to retain the head relative to the shear component via the stem; whereby breakage of the stem frees the head to be displaced into the indication position by the urging member.

In a more specific embodiment of the present invention, the shear component is a shear pin defining an axial bore extending there through and the shear pin includes a breakage plane transversely of the shear pin.

In accordance with one other aspect, the invention provides a method of indicating breakage of a shear component, comprising the steps of retaining an indicator member against an urging force urging the indicator member towards an indicator position; upon breakage of the shear component, releasing the indicator member thereby allowing the urging force to displace the indicator member into the indicator position.

In accordance with yet another aspect, the invention provides a wireless breakage indicator for a shear pin having an axial bore. The indicator comprises a stem having a head and a foot at opposite ends thereof; a sleeve around a portion of the stem between a first and second axial positions, the stem and sleeve adapted to be broken by the shear pin in the event of its breakage; a spring compressed between the head of the stem and a first end of the sleeve; the foot of the stem being retained to the second end of the sleeve. The breakage of the stem frees the head to be displaced by the spring and indicate breakage of the shear pin. The indication can be direct, by visual inspection of the displaced head, or indirect by the displacement of the head activating a transmitter.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
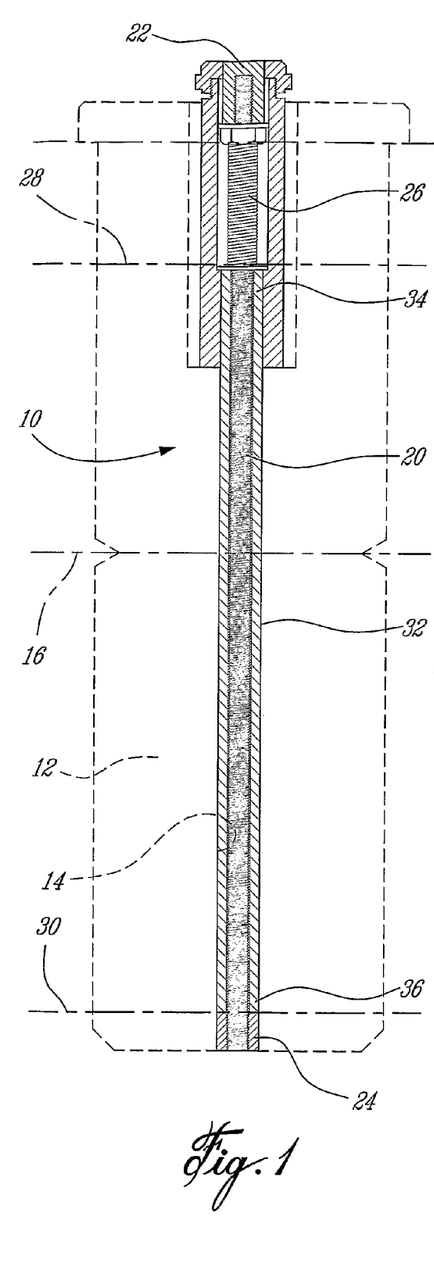
FIG. 1 is a cross sectional view of a shear pin breakage indicator in accordance with an embodiment of the invention, shown inserted within a hollow shear pin.

In accordance with one embodiment of the invention, depicted in FIG. 1, the invention provides a shear pin breakage indicator 10. The indicator 10 is inserted in a shear pin 12. The shear pin 12 has a breakage plane 16 transverse to the axis of the pin 12, where it is to be broken into two separate parts by a predetermined level of shear stress. The shear pin 12 also has an axial bore 14 in which the indicator 10 is inserted. Although the embodiment of the invention is illustrated with reference to a shear pin one skilled in the art will understand that the indicator can be used to indicate shearing of other shear components.

Figure 2:
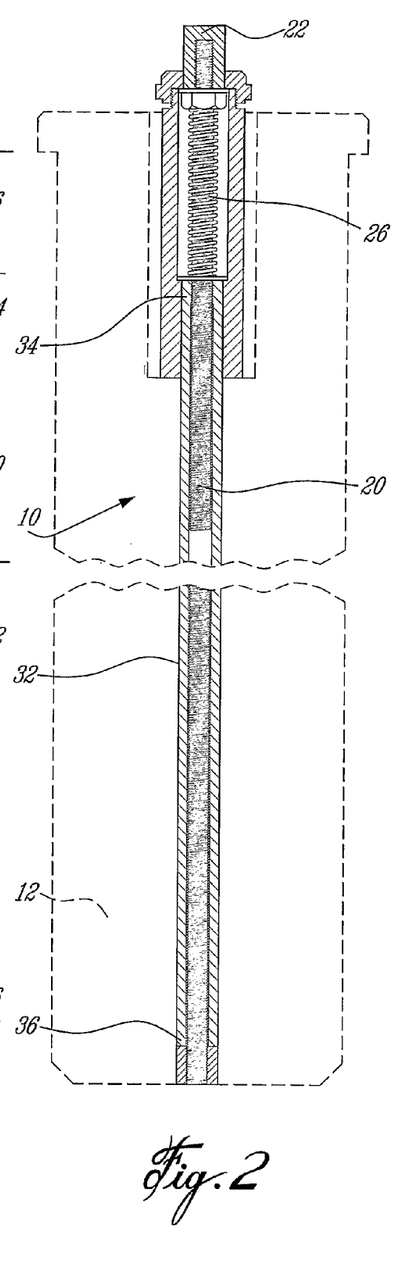
FIG. 2 is a cross sectional view of the shear pin breakage indicator of FIG. 1, shown in indicating position, with the shear pin broken.

The indicator 10 includes a stem 20 which is inserted in the bore 14 and intersects the breakage plane 16. The stem 20 has a head 22 at one end and a foot 24 at the other end. A sleeve 32 is concentric with a portion of the stem 20 between a spring 26 and the foot 24, and thus covers a portion of the stem 20 extending from a first axial position 28 to a second axial position 30. The sleeve 32 has opposed first end 34, and second end 36. A coil spring 26 is concentric with the stem 20, and is compressed between the head 22 and the first end 34 of the sleeve 32 and is kept in this compressed state by the foot 22. The spring 26 urges the head 22 out of the bore 14. However, the stem 20 is retained in position by the foot 24 abutting against the second end 36 of the sleeve 32. When the shear pin 12 is broken, as illustrated in FIG. 2, both the sleeve 32 and the stem 20 break into separate parts. The head 22 is thus released from the foot 24 and is displaced outwardly of the shear pin 12 by the spring 26, into a position referred to as the indication position. The displacement of the head 22 is visually indicative of the breakage of the shear pin 12. The stem 20 and sleeve 32 are made of a material that breaks easily with the shear pin 12 when breakage occurs, and which does not bend or swell by absorbing oil or humidity so that the stem 20 does not become jammed in the sleeve 32. The preferred materials are polyamides, and most preferably, woven glass fabric epoxy laminate of NEMA FR-4 grade which is economical, easy to machine, and commonly available.

The sleeve 32 is used to provide easy installation of the indicator 10 in the shear pin 12, and to allow manufacture of the indicator 10 and the pin 12 independently for applications where such a design a possible. In one alternative embodiment, the sleeve is omitted, and the indicator is directly assembled to a shear pin. The spring can then be compressed onto a shoulder of the bore at one end, for example, whereas the foot of the stem can be secured by any suitable means relative to the shear pin at the other end, like by screwing a nut onto a portion of the foot extending out of the bore. In this alternative, the stem is in direct contact with the bore.

Furthermore, although a coil spring 26 is used to maintain an urging force upon the head in the preferred embodiment, one skilled in the art will understand that any other suitable urging member can be used to displace the head upon breakage of the stem, such as a system in tension instead of compression, or a compressed gas, for example.

Figure 3:
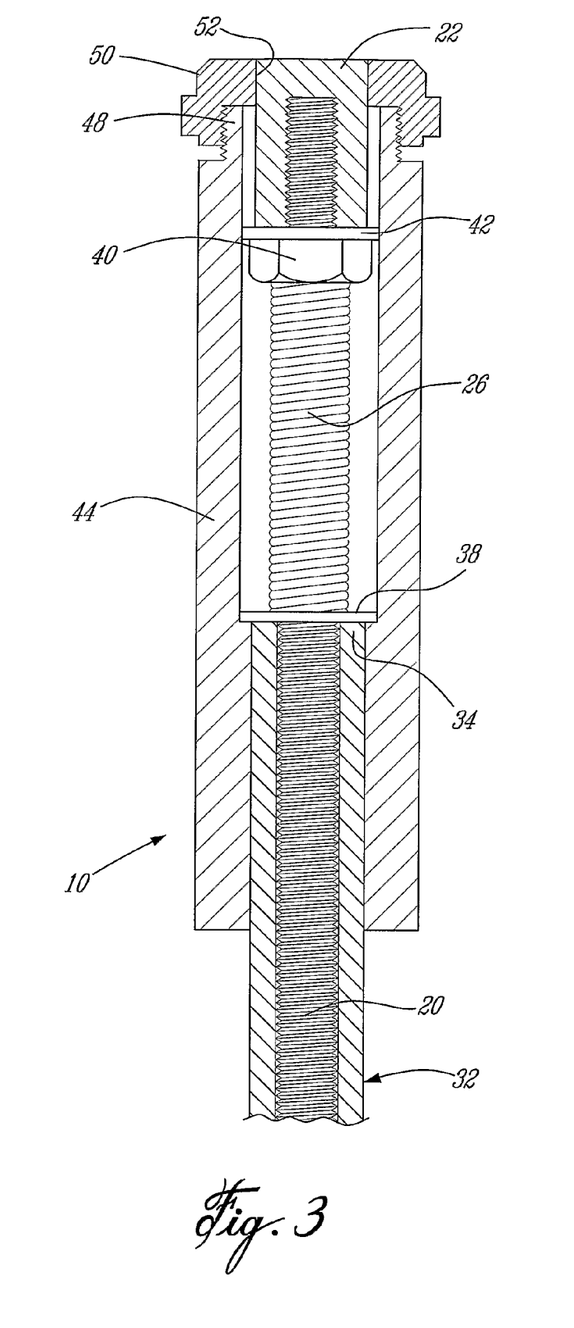
FIG. 3 is a fragmented cross sectional view of the shear pin breakage indicator of FIG. 1.

Turning now to FIG. 3, the indicator 10 is illustrated in more detail. The sleeve 32 is provided concentric to the stem 20. A washer 38 is provided against the first end 34 of sleeve 32 and serves as an abutment member against which the spring 26 urges the head 22 away. The washer 38 serves as an intermediary between the spring 26 and the sleeve 32. The stem 20 is preferably threaded and the head 22 and foot 24 are screwed to opposite ends thereof. The foot 24 allows the adjustment of the head 22 until it is flush with the cover 50. The nut 40 is screwed on the threaded stem 20 between the spring 26 and the head 22, and can be displaced along the stem to adjust the compression of the spring 26. The nut 40 is also used as an abutment for the spring 26. A second washer 42, wider than the head 22, is provided between the nut 40 and the head 22 to prevent the head from being expulsed.

Figure 4:
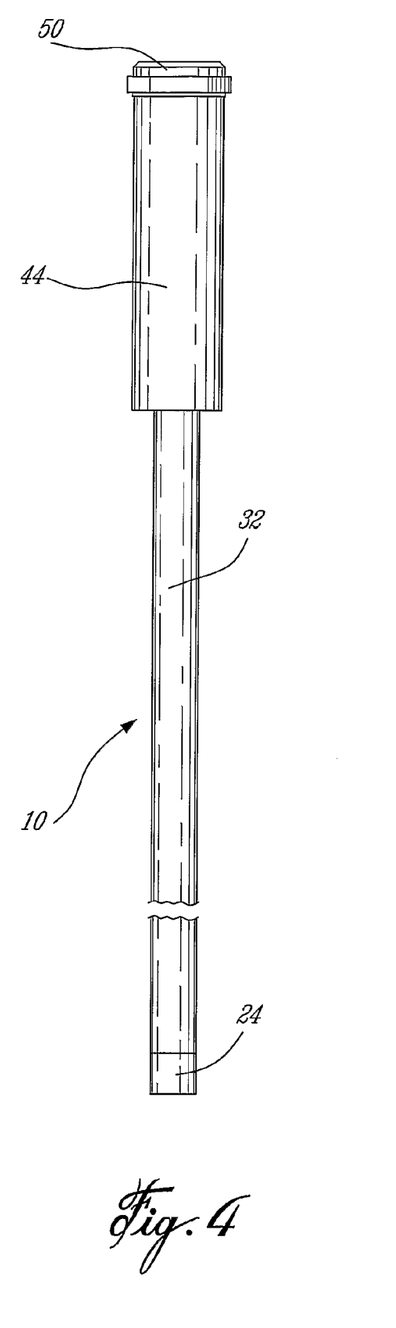
FIG. 4 is a side elevation view of the shear pin breakage indicator of FIG. 1.

A protective chamber 46 is defined by an annular wall 44 secured around the upper end 34 of stem 20. The annular wall 44 and the sleeve 32 are preferably made of the same material and are glued to one another, but may also be manufactured as a single piece. The other end 48 of the annular wall is threaded and extends away from the sleeve 32. The annular wall 44 defines chamber 46 where the spring 26, washers 38, 42, and nut 40 are enclosed. A cover 50 is screwed to the threaded end 48 of annular wall 44. The cover 50 has an aperture 52 defined in it, in which the head 22 is engaged. The longitudinal displacement of the head 22 is guided within the aperture 52. Preferably, the washer 42 is wider than the head 22, and defines a ledge extending laterally from the lower portion thereof. Upon displacement of the head 22, the movement of the head 22 is limited by the washer 42 abutting the neck portion of the cover 50 defining the aperture 52, which keeps the head 22 from being ejected from the shear pin 12. The head 22 is preferably of a highly visible color so that its position may be easily identified visually. FIG. 4 illustrates the external appearance of the indicator 10, the indicator measures approximately 15 cm in length but can be manufactured according to any suitable length.

In the embodiment of FIGS. 1 through 4, the indicator 10 is entirely mechanical and the detection of shear pin breakage is done when an operator visually inspects the head 22 and notes whether the head 22 has been displaced outwardly by the spring 26 or not.

Figure 5:
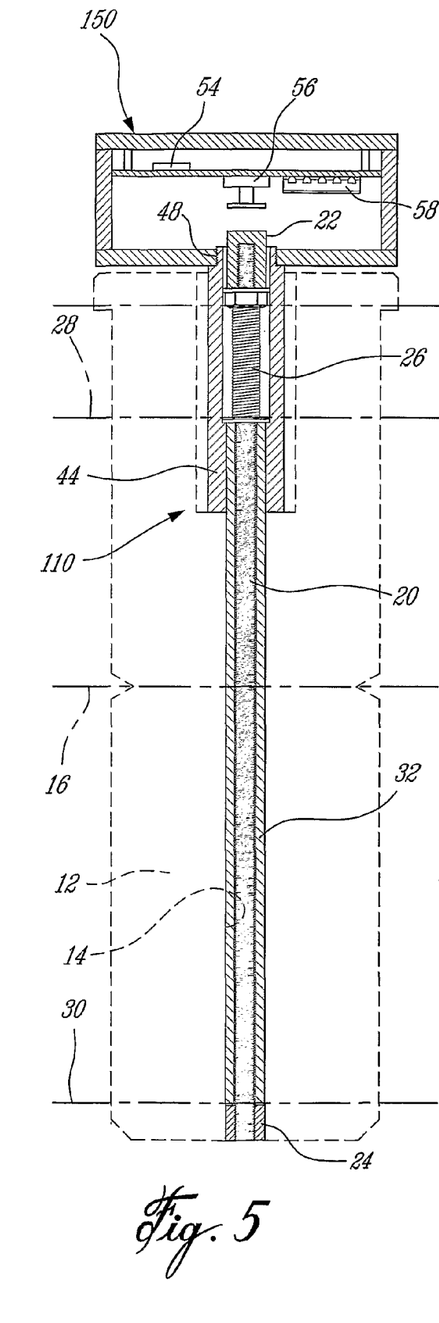
FIG. 5 is a cross sectional view of a shear pin breakage indicator in accordance with another embodiment of the invention, with an electronic indicator, shown inserted within a hollow shear pin.
Figure 6:
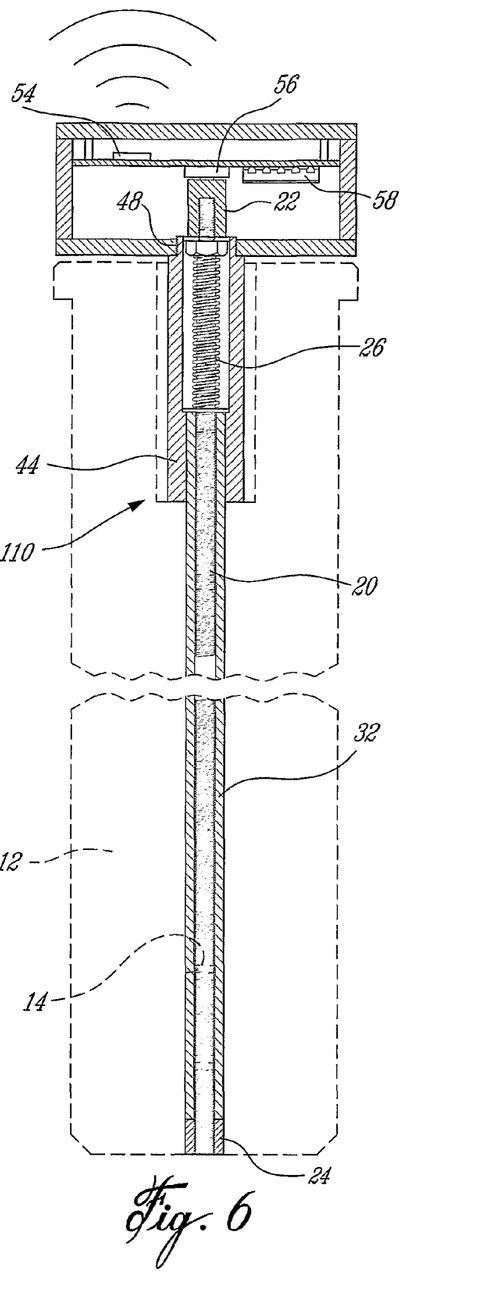
FIG. 6 is a cross sectional view of the shear pin breakage indicator of FIG. 5, shown in indicating position, with the shear pin broken.

An alternative embodiment with a wireless transmission indicator 110 will now be described with reference to FIGS. 5 and 6. Conversion of the mechanical indicator 10 to the wireless transmission indicator 110 is achieved by removing cover 50 from the threaded end 48 and replacing it by a transmitter casing 150.

The transmitter casing 150 is screwed onto the upper end 48 of the annular wall 44. The casing 150 includes a transmitter 54 and a microcontroller 58, as well as a push button 56. The push button 56 serves to trigger the microcontroller 58 to activate a wireless transmission of a signal from the transmitter 54. It is disposed in the displacement axis of the head 22. Upon breakage of the shear pin 12, the head 22 is displaced by the spring 26 and contacts the push button 56 which activates the transmission (see FIG. 6). Instead of the push button 56, many suitable alternative contact members can be used and be activated by the displaced head, like a relay, a magnetic contact or even a proximity sensor. However, the push button 56 is preferred due to its simplicity and low cost.

In applications where more than one shear pin must be monitored for breakage, like in the field of hydroelectric power plants for example, a need exists for identifying the precise location of a broken shear pin. Hence, the microcontroller 58 is programmed to provide an address code associated to the location of the particular shear pin 12 upon activation of the push button 56. Typically, there are around 10 to 40 wicket gates in an hydroelectric generator and an address coded on 8 bits (256 addresses) is usually sufficient to distinguish the different shear pins. The address code is emitted by the transmitter 54 and is then received by a receiver (see FIG. 8) and is analyzed to determine the location of the broken pin. A LED on the casing 150 can be provided in combination with or instead of the transmitter to provide a visual indication of shear pin breakage.

Figure 7:
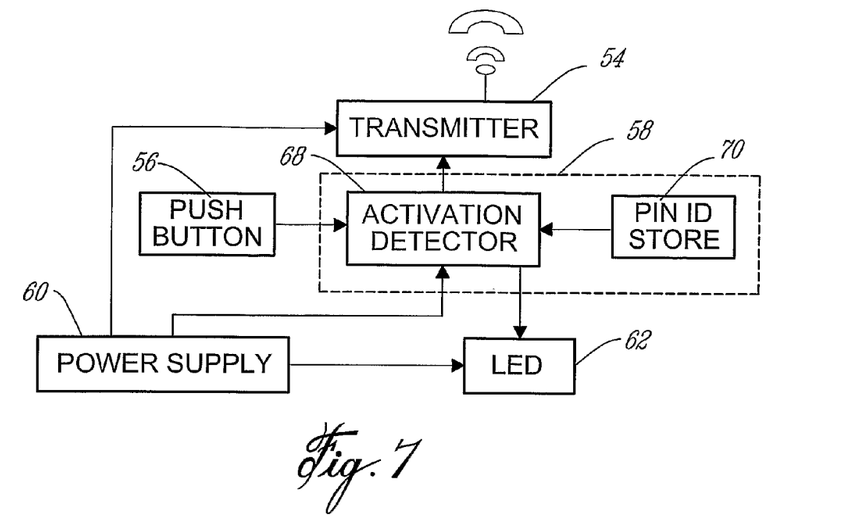
FIG. 7 is a schematic view of the circuitry components of the indicator of FIG. 5.

The preferred circuitry is illustrated in FIG. 7, it includes the microcontroller 58, the push button interrupter 56 that is mechanically activatable, the RF transmitter 54, the LED 62, and the power supply 60. The microcontroller 58 is maintained in a sleep mode, which allows energy savings and prolongs the battery life, as an activation detector algorithm 68 wakes up the microcontroller 58 when stimulation is detected. The address is programmable into the microcontroller 58 and is saved in a pin ID store 70. Preferably, the microcontroller 58 is connected to a 2.5 to 3.6 Volt power supply 60. For example, 3 Volt, 200 mAh lithium battery should be sufficient to power the circuitry for a period of about two years. The transmitter 54 is a radio frequency (RF) transmitter and should have a low energy consumption when in sleep mode and a small sized antenna. However, one skilled in the art can select alternative modes of communication between the indicator and the receiver.

Figure 8:
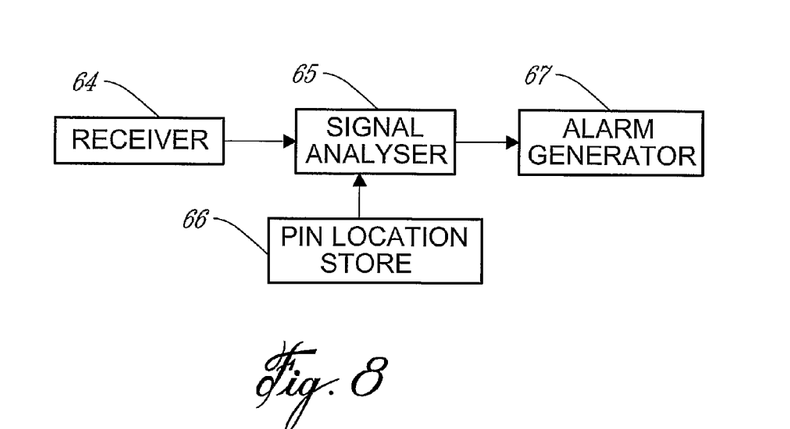
FIG. 8 is a schematic view of the components of the analyzer circuit for the indicator of FIG. 5.

As illustrated in FIG. 8, an RF receiver 64 receives the signal from the transmitter, and communicates the data to a signal analyzer 65. A single receiver can receive signals from several indicators. The signal analyzer 65 identifies the location of a broken shear pin by comparing the address received to a pin location store 66. The signal analyzer 65 consequently activates an alarm generator 67. The alarm generator triggers a relay or an electric signal and can be announced by a flashing icon on a monitor or a siren in a surveillance room, a technician observing the monitor can thus identify which shear pin(s) have failed and take appropriate action. The alarm generator could also activate a relay which stops the generator before any major problem occurs, for example.

Figure 9:
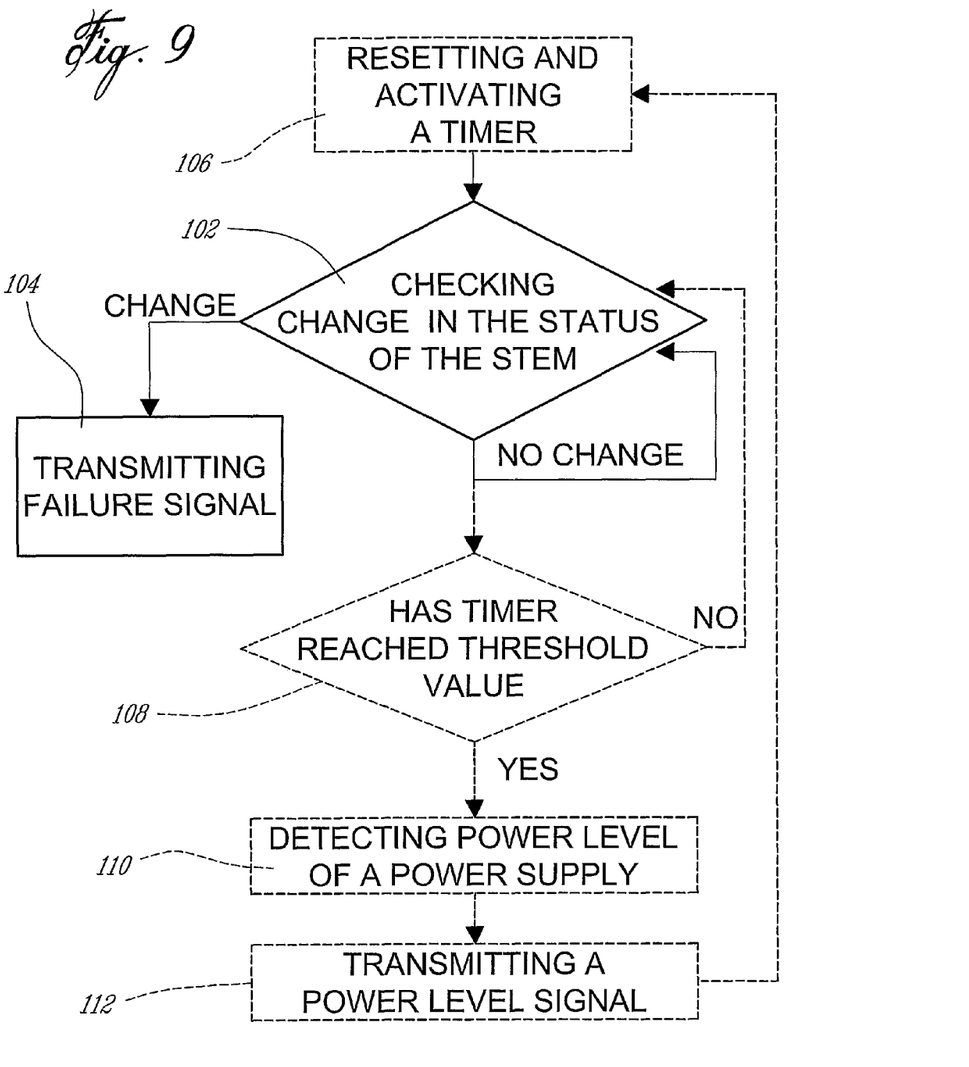
FIG. 9 is a flow chart illustrating the main steps of a method of indicating breakage of a shear pin in accordance with still another embodiment of the invention.

The main steps of the preferred method in the electronic transmission embodiment is illustrated in FIG. 9. The microcontroller remains in sleep mode and relies on the push button to detect 102 the status of the stem. If the stem is broken by a broken pin, the head activates the push button and its change in status is detected. After the depression of the button by the head (see FIG. 6), the microcontroller activates the transmitter to transmit 104 a breakage signal including the address code of the broken pin. If the button is not depressed, the algorithm maintains its sleep mode, waiting for a change of the status of the stem.

Another way to use a minimal amount of power is to use the push button as a power interrupter to the microcontroller (between the power source and the microcontroller) and to allow power transfer only when depressed. The transmission algorithm can be hardcoded in the microcontroller which can be automatically activated upon being powered and activate the signal transmission.

In addition, the microcontroller can be awakened by a preset periodic timer to allow monitoring of the state of the battery. After each verification of the state of the battery, a signal will be transmitted to the receiver to confirm the working condition of the electronics. An absence of signal within the predetermined time delay will mean that proper maintenance is required as soon as possible to replace the battery or the detector. Thus, in normal operation (i.e. the shear pin is not broken), the shear pin detector can transmit periodically a confirmation signal to confirm its integrity, although this is optional, and in alarm operation (i.e. the shear pin is broken), the shear pin indicator transmits an alarm signal to indicate the broken shear pin.

The sub steps of the method for signaling the power level of the battery include starting 106 a timer, which can occur when initializing the microcontroller for example. When the timer is determined 108 to have reached its threshold value, a signal is transmitted 112 to confirm the correct functioning status of the circuitry due to sufficient power level in the battery. The timer is then reset 106 until the threshold value is reached again. Preferably, the absence of the confirmation signal is used to determine the malfunction in the circuitry, but the power level of the battery could alternatively be checked 110 upon the timer reaching the threshold value 108, in which case the transmitted signal could contain the power level information. This would allow the triggering of an alarm by the alarm generator that indicates the power level is low and the battery of the corresponding indicator should be replaced. Although it is illustrated in that sequence in FIG. 9, It is not necessary for the algorithm to check 102 the status of the stem first, and then check the timer 108 in that order, any suitable sequence can be used and both verifications can be done in parallel.

To prevent the risk of collision during transmission, the messages are short and repeated many times with a random delay between each transmission. Therefore, if two transmitters transmit signals at the same time, there will be very low probability that the second transmission attempt fails if the first has failed. Repetition also serves as a double-check on the validity of the signal.

The embodiments of the invention described above are intended to be exemplary only. The scope of the invention is therefore intended to be limited solely by the scope of the appended claims.

The invention claimed is:

1. A breakage indicator for a shear component, the indicator comprising:
    a head connected to a foot via a stem, the stem being adapted to be broken into a head portion and a foot portion at an axial location as a result of breakage of the shear component;
    an urging member adapted to displace the head towards an indication position upon breakage of the stem;
    the foot being adapted to retain the head relative to the shear component via the stem;
    whereby breakage of the stem frees the head to be displaced into the indication position by the urging member;
    a sleeve around at least the axial location of the stem, the sleeve being adapted to break with the stem in the event of the breakage of the shear component;
    an annular wall defining a chamber in the form of an enlarged axial bore, the annular wall having a first end secured to the first end of the sleeve and a second end extending from the first end towards the head; whereby the urging member is in the chamber; and
    a casing defining an enclosure is secured to the second end of the annular wall, the casing having a transmitter for emitting a signal and a contact member associated with the transmitter, the contact member being disposed within the enclosure and in the axis of displacement of the head and being adapted to be activated by the head when the head is displaced by the urging member; whereby the transmitter provides a wireless indication of the breakage subsequently to the activation of the contact member.

2. The breakage indicator of claim 1 wherein the shear component is a shear pin with an axial bore, a breakage plane transverse to the bore, and the stem is adapted to be located within the axial bore of the shear pin, whereby breakage of the shear pin breaks the stem.

3. The breakage indicator of claim 1 wherein the urging member is in compression against the head.

4. The breakage indicator of claim 3 wherein the stem is threaded and wherein the foot is secured to the stem by screwing, and the urging member is compressed between the first end of the sleeve and a nut screwed onto the stem adjacent the head, whereby displacing the foot along the stem adjusts the position of the head relative to the shear component and displacement of the nut along the stem adjusts the compression of the spring.

5. The breakage indicator of claim 3 wherein the stem is threaded and wherein the urging member is compressed between the first end of the sleeve and a nut screwed onto the stem adjacent the head; whereby displacing the nut along the threaded stem adjusts the compression of the urging member.

6. The breakage indicator of claim 1 wherein at least one of the sleeve and the stem are made of a polyamide material.

7. The breakage indicator of claim 1 wherein the annular wall and sleeve are secured to one another by one of gluing, screwing and machining as a single part.

8. The breakage indicator of claim 1 wherein the annular wall has a neck portion at a second end thereof, the neck portion having an aperture sized to the head in order to guide the displacement of the head; and the head has a ledge larger than the aperture, the ledge extending transversally from an end of the head nearer to the axial location, the ledge adapted to abut against the neck portion following displacement of the head to keep the head from being expulsed from the shear component; whereby the other end of the head extends outwardly from the neck to indicate shear pin breakage.

9. The breakage indicator of claim 8 wherein the neck is defined by a removable cover secured to the second end of the annular wall.

10. The breakage indicator of claim 1 having a neck portion secured relative to the shear component, the neck portion defining an aperture in which the head is to be displaced.

11. The breakage indicator of claim 10 wherein the head has a ledge larger than the aperture, the ledge adapted to abut against the neck portion when the head is in indication position, whereby the head is kept from being expulsed from the shear component by the abutment.

12. The breakage indicator of claim 1 wherein the casing is removably secured to the annular wall by screwing of communicating threads.

13. The breakage indicator of claim 1 further comprising a casing defining an enclosure is secured relative to the shear component, the casing having a contact member disposed within the enclosure and adapted to be activated by the head when the head is displaced by the urging member; and an emitter associated with the contact member; whereby emitter provides an indication of the breakage subsequently to the activation of the contact member.

14. The breakage indicator of claim 1 wherein the emitter is one a LED indicator activated to emit a visual indication of shear pin failure, and a transmitter activated to emit a wireless alarm signal of shear pin failure, subsequently to the head activating the contact member.

15. The breakage indicator of claim 1 wherein the stem is threaded and wherein foot is secured to the stem by screwing, whereby displacing the foot along the threaded stem is adapted to adjust the axial position of the head relative to the shear component.

16. The breakage indicator of claim 1, further comprising a breakage indicating circuit having an emitter connected to a contact member, the contact member adapted to be activated by the displaced head, whereby the emitter emits an indication of shear pin failure when the head is displaced by the urging member.

17. The breakage indicator of claim 1 where the contact member is a push button.

18. The breakage indicator of claim 1 wherein the urging member is a coil spring in compression between the head and the axial location and concentric with the stem.

19. The breakage indicator of claim 1 wherein the stem is made of woven glass fabric epoxy laminate.

20. A method of indicating breakage of a shear component, comprising the steps of:
retaining an indicator member against an urging force urging the indicator member towards an indicator position;
inserting a stem within a bore of the shear component;
upon breakage of the shear component, releasing the indicator member thereby allowing the urging force to displace the indicator member into the indication position; wherein the indicator member includes a head connected to a foot via the stem adapted to be broken as a result of breakage of the shear component; the step of retaining the head includes retaining the head by the foot via the stem; and the releasing includes breaking the stem thereby freeing the head from the foot;
providing a contact member adapted to detect the displacement of the head portion into the indication position; and upon the detection of the displacement, emitting an alarm signal of breakage indication.

21. The method of claim 20 wherein the stem is threaded, further comprising at least one of the steps of: adjusting the position of the head by screwing or unscrewing the foot; and adjusting the urging force by screwing or unscrewing the nut.

22. The method of claim 20 further comprising the steps of providing a timer with a threshold value; starting the timer; upon the timer reaching the threshold value, transmitting a confirmation signal.

* * * * *